US006734873B1

United States Patent
Herf et al.

(10) Patent No.: US 6,734,873 B1
(45) Date of Patent: May 11, 2004

(54) METHOD AND SYSTEM FOR DISPLAYING A COMPOSITED IMAGE

(75) Inventors: Michael Herf, Studio City, CA (US); James Klingshirn, Santa Barbara, CA (US); Sreekant Kotay, Richboro, PA (US)

(73) Assignee: Viewpoint Corporation, New York, NY (US)

( * ) Notice: Subject to any disclaimer, the term of this patent is extended or adjusted under 35 U.S.C. 154(b) by 453 days.

(21) Appl. No.: 09/620,942

(22) Filed: Jul. 21, 2000

(51) Int. Cl.[7] ................................................ G09G 5/00
(52) U.S. Cl. ..................... 345/629; 345/630; 345/545; 345/538; 345/634; 345/636
(58) Field of Search ................................. 345/629, 630, 345/545, 538, 634, 636, 541, 542, 561, 539

(56) References Cited

U.S. PATENT DOCUMENTS

| 5,526,017 A | * | 6/1996 | Wilkie .......................... 345/115 |
| 5,844,569 A | | 12/1998 | Eisler et al. |
| 5,880,740 A | | 3/1999 | Halliday et al. |
| 5,883,627 A | | 3/1999 | Pleyer |
| 5,983,190 A | | 11/1999 | Trower, II et al. |
| 6,011,537 A | | 1/2000 | Slotznick |
| 6,067,098 A | | 5/2000 | Dye |
| 6,342,900 B1 | * | 1/2002 | Ejima et al. ................. 345/698 |

FOREIGN PATENT DOCUMENTS

| WO | WO 00/05890 | 2/2000 |
| WO | WO 01/44969 A2 | 6/2001 |
| WO | WO 01/52034 | 7/2001 |

OTHER PUBLICATIONS

Kevin E. Martin et al., :Direct Rendering Infrastructure, Low–Level Design Document, http://sourceforge.net/doc/design_low_level.htn.

* cited by examiner

Primary Examiner—Matthew C. Bella
Assistant Examiner—Tam Tran
(74) Attorney, Agent, or Firm—Kenyon & Kenyon

(57) ABSTRACT

An efficient method and system for displaying integrated transparent objects and animation with a window, such as an Internet Web page is described. The present invention implements a plugin-control, such as a Netscape plugin or ActiveX control, in the host program, such as a Web browser, wherein the plugin-control provides at least one graphics buffer in addition to the buffers used by the host program. The plugin-control can function according to the host program Application Programming Interface (API) for the plugin-control under which the at least one additional buffer is used to composite a "compositing plane" containing the transparent objects and animation with the host program window and where the resulting composited scene is returned to the host program buffers as part of the regular host program draw pipe. Additionally, the host program API may be circumvented and the resulting composited scene may be written directly to the front buffer for display on the display device. In particular, in one embodiment, the plugin-control implements the at least one additional buffer it provides in the system memory in order to improve the performance of compositing images with many transparent pixels with a Web browser window. This improvement results from both the faster reading of data from the system memory than from video and the higher number of read-modify-write operations where a large number of transparent pixels exist and from current Web browser implementation of buffers solely in video memory.

96 Claims, 6 Drawing Sheets

METHOD AND SYSTEM FOR DISPLAYING A COMPOSITED IMAGE

FIELD OF THE INVENTION

The present invention relates to a computer system and method for displaying a compositing plane in a parent window.

BACKGROUND INFORMATION

There is great interest in extending the capabilities of the Internet World Wide Web (hereinafter "Web") pages by providing new or improved functionality. One area ripe for improvement is the rapid overlaying or blending of transparent compositing planes, containing objects such as animation and three-dimensional (3D) images that can be viewed from all angles, with a Web page. Currently, attempts to do so have been stymied by physical constraints on the speed at which this process can be performed thereby hindering the implementation of this functionality. Compositing planes, especially alpha-based compositing (see alpha blending below), is more flexible and visually interesting than either of the two options-displaying graphics in an opaque rectangular window or using simple on/off transparency-discussed below.

Rendering is the process of reproducing or representing, inter alia, various elements of an animation or 3D scene, such as objects, models, surfaces, lighting, and camera angle, into a single two-dimensional (2D) raster image called a frame. Rendering is performed according to an algorithm specifying how this reproduction or representation will be calculated. Rendering algorithms generally include certain basic calculations. A visible surface determination is made to identify what the camera sees of the objects in a scene. Surface qualities of the objects are then assigned to provide appropriate shading. The calculated 3-dimensional (3D) scene is then projected into a 2-dimensional (2D) raster image with appropriate consideration of many factors to accurately reflect the scene. For example, color values must be adjusted to reflect the scene's lighting. This 3D scene projection into a 2D raster image is termed a scan conversion or a polygon scan conversion. The polygon scan conversion results in pixel data written to a frame buffer (a buffer usually in video memory and termed either a back buffer or front buffer) before being saved to disk or presented on a display device. The entire rendering process from object identification to pixel data in the frame buffer is very resource and time intensive and thus involves a tradeoff between speed and quality.

The tradeoff between speed and quality in the rendering process becomes most apparent in animation. Rendering entire frames in an animation, though possible, is not desirable because of the high resource requirement and the lack of flexibility in the animation. Instead, animation can involve a process called compositing whereby various component elements are assembled into an image. In fact, compositing combines the component elements (images) by overlaying or blending them. For example, an animation where a 3D character walks in front of a complex 3D background could be implemented by creating a single rendered background image and compositing the 3D character over the same single background image as it moves from frame to frame. Compositing may also require the translation, scaling, or rotating of the component elements before they are combined, especially if the component elements are of different sizes. By overlaying or blending components, compositing reduces the resources required for animation while providing greater flexibility in the number of component combinations available.

In a Web page context, compositing involves the combination of a predefined area containing one or more objects with a Web page underneath. This predefined area is termed a compositing plane and can contain a number of different objects such as an animation, an interactive 3D image, an interactive 2D image, etc. A compositing plane is generally transparent or semi-transparent, and contains objects or areas that may be opaque. An opaque window is a rectangular area that has no transparent or semi-transparent areas and may be thought of as an opaque compositing plane (not a standard term). For the sake of clarity, the terms transparent compositing plane and opaque window will be used to distinguish between the two. The term compositing plane will be used to refer to either a transparent compositing plane or opaque window.

A compositing plane is either overlaid, in the case of an opaque window, or seamlessly blended, in the case of a transparent compositing plane, with a Web page resulting in compositing plane objects appearing to be a part of the Web page. Blending techniques, such as conventional Alpha blending facilitate this seamless integration by eliminating the sharp differences, termed "aliases", along the boundaries of the objects in a transparent compositing plane by allowing semi-transparent drawing. In conventional computer graphics, each pixel stores three channels of information, e.g., red, green, and blue, and in some cases a fourth channel, the alpha channel. The alpha channel controls additional drawing features of the pixel such as the level of transparency or opacity. Alpha blending is the use of the alpha channel to simulate visual effects such as placing a cel of film in front of an object. The conventional alpha blending technique involves a simple mathematical formula:

$$C_o = C_s * (A) + (1-A) * C_d$$

C represents the red, green, or blue component pixel information in both the source and destination image. The subscript o denotes the output color, s denotes the source color and d denotes the destination color. In this equation the source pixels are multiplied by an alpha factor A while the destination pixels are multiplied by the inverse alpha value (1–A). The range for the alpha value in A is between zero and one. Each color component (R,G,B) must have the same dynamic range for the source and destination bitmap (i.e. five bits for red in source and destination). However dynamic ranges between color components within a pixel need not be the same (i.e., red may be five bits and green may be six bits). Alpha blending is only necessary where transparent or semi-transparent drawing occurs using a compositing plane. Overlaying an opaque window onto a Web page is a more simple endeavor that requires no alpha blending, and only the simple replacement of pixels. The main technological hurdles arise with transparent compositing planes.

Transparent drawing, by its very nature, presents additional complexities because portions of the underlying page that are visible through the transparent regions of the compositing plane must be still be drawn and updated as well as blended with the objects on the compositing plane. Under traditional browser techniques, implementing a compositing plane as a separate window does not allow the window to be viewed as a transparent layer. It does, however, allow faster drawing of single objects, especially animation, because of the direct access to the operating system without the need for intermediaries. Implementing the compositing plane using a windowless plugin control standard, i.e., a plugin-control format that provides access to the back buffer in a layered, double or multiple buffered environment, allows for faster messaging which in turn allows for noticeable improvement when multiple objects need to be drawn quickly as in the case of transparent animation. Windowless plugins and controls, henceforth referred to as windowless plugin-controls, are executable software that extends the functionality of the Web browser allowing additional types of objects to be included in a Web page without requiring the implementation of a separate rectangular window. The process of drawing either a separate opaque window or a transparent compositing plane on top of a background image in a window, such as a Web page, follows standard 3D graphics practice, such as implementing a 3D pipeline.

A 3D pipeline is the sequence of steps necessary to generate or render a 3D scene. FIG. 1 is a block diagram illustrating an example 3D pipeline according to one conventional embodiment. Other implementations of a 3D pipeline can exist, and the order of the steps in the sample pipeline may be altered. As shown in FIG. 1, the scene definition stage 105–120 is a first step in most conventional 3D pipelines. The scene definition stage 105–120 begins with the identification of the individual objects to be included in a scene 105. Mathematical representations of the objects to be included in the scene are retrieved and any necessary alterations made 110. Lighting is then calculated 115, and a visible surface determination should then be made to identify what a virtual camera would see of the objects relative to one another in the scene 120. The mathematical representations of the individual objects are usually defined using a set of polygons, typically triangles or quadrilaterals, representing the surface of the object. Polygonal definitions are not effective in defining some objects and do not provide data about object interiors. Other methods such as nonuniform rational B-splines (NURBS) and quadratic patches are alternative means that directly describe the curved object surfaces and may become more prevalent in future graphics systems. These curved-surface models are converted to polygonal models using a tessellation process that may involve multi-resolution meshing or mesh refinement. Tessellation may occur at any stage of the 3D pipeline but usually occurs during the scene definition 105–120 and geometry stages 125–140.

Following the scene definition stage 105–120, the geometry stage 125–140 occurs during which the coordinate system of the object, the model space, is aligned with the entire scene along the X, Y, and Z axes, termed the view space. This coordinate transformation process occurs during the projection step 125 of the geometry stage 125–140. Clipping and culling 130 is the step where polygons that are not visible are identified so that they do not have to be processed thus resulting in a time savings. During the setup processing step 135, the view space must then be converted into the 2D coordinates of the pixels on the display device and a third set of coordinates representing depth. This third set of depth coordinates, Z values, are usually stored in a separate buffer in memory, a Z-buffer. The final step in the geometry stage 125–140 is rasterizing the image 140, whereby the previously discussed polygon scan conversion takes place.

The third stage in the 3D pipeline is the rendering stage 145–160. During the rendering stage 145–160, the rendering engine calculates each pixel's new color 145 in a process that takes into account the effects of lighting whether by using a single point for each polygon, known as flat shading, using a calculation made at each vertex and interpolated across a polygon face, known as Gouraud shading, or by independently calculating a value for each pixel, known as Phong shading. After shading has been calculated 145, texture mapping is performed 150. Texture mapping 150, the most memory intensive aspect of 3D drawing, wraps texture maps around the objects providing a more natural texture look. Following texture mapping, depth sorting 155, the Z-buffering process, is performed to avoid drawing polygons that are not visible and have not been caught during the clipping and culling process 130. The Z-values, usually in a Z-buffer, are used during this depth sorting process. Once Z-buffering is completed 155, the 3D pipeline ends with the scene displayed on the display device of the computer system.

FIGS. 2 and 3 are block diagrams, using texture maps as an example, illustrating how complex 3D objects and animations are conventionally displayed in one embodiment of a computer system using software rasterization. The first step in the process 250 is the reading of the texture map data from a storage device 200, such as a hard disk drive, and loading the texture map data into system memory 210. The data travels via a storage device bus 235, such as the IDE or SCSI bus, and chipset 205 before being loaded into system memory 210. When the texture map data is needed for a scene, the texture map data is read 255 from the system memory 210 into the central processing unit (CPU) 215 where visible surface determinations are made. Textured polygons are drawn to reflect the correct point of view. Surface qualities are then applied, rasterizing the projected textured polygons to reflect, among other things, color values and lighting, before the transformed texture map is subsequently written to system memory 210. During the third step 260, the graphics controller 220 reads the transformed texture maps from the system memory 210 and writes the transformed texture maps into the local video memory 225, also called the frame buffer, off-screen RAM, or graphics controller memory. The reading and writing of the texture maps from system memory 210 to local video memory 225 occurs over the peripheral component interrupt (PCI) bus 245 according to the embodiment of a computer system used in this example. The graphics controller 220 then reads the component frame data 265, including the texture maps, from the video memory 225 and renders a frame, writing the results into the front buffer in video memory 225. Once the frame is stored in the front buffer 265, the computer system's digital-to-analog converter (DAC) 275 reads the frame data from the front buffer, converts the digital data into an analog signal, and sends the analog signal to the display 230 thereby driving the display 270.

In order to improve performance, enhancements to the embodiment of the computer system discussed have been made. One example of an enhancement is the Pentium III chip which can better handle the geometry stage of the 3D pipeline, such as through a higher polygon per second throughput rate as well as a dual independent bus architecture. Another example is the addition of Accelerated Graphics Port (AGP) technology to the computer system embodiment previously discussed. AGP implements an additional high speed bus 380 between the chipset 305 and the graphics controller 320 providing greater bandwidth over the typical 132 megabytes per second of the PCI bus. The AGP bus 380 also alleviates congestion from the PCI bus by separating the bandwidth requirements of the complex 3D and animation from the PCI bus traffic involving the I/O (input/output) devices, such as 100 megabytes per second LAN cards and Ultra DMA disk drives. AGP does not help with reading information back from video memory, which is very slow, and therefore does not alleviate the problem addressed by the present invention. AGP also improves hardware rasterization which is not a concern of the present invention.

3D graphics and animation drawing typically involves a double or multiple buffering process but may also be implemented with a single buffer. Typically, single buffering is not used because it can cause screen flicker. Conventional Web browsers use double buffering but do not have a Z-buffer. Instead, current browsers use a "Z-order" which does not require any extra storage like a Z-buffer does. Conventional Web browsers draw elements from back to front such that each element has a priority, the Z-order, and are drawn one after the other in a specific order until the Web page has been drawn into the back buffer. In a double buffering process, a front buffer contains the on-screen data displayed on the display device while a back buffer holds the partially or fully rendered contents of the next screen update to be displayed. In a multiple buffering process, additional back buffers are used to allow rendering to occur while the back buffer is being swapped into the front buffer. The front buffer and back buffer or buffers (and Z-buffer where used-not in current Web browsers) are typically stored in video memory. Conventional video memory is quicker to write into but slower to read from than system memory. Therefore, video memory loads quicker but is slower when its contents must be retrieved.

In a double or multiple buffering process, data is typically swapped from the back buffer into the front buffer according to three approaches: bit-block transfer; video page flipping; and auxiliary per pixel control. Bit-block transfer, typically called "bitblt" in the industry, is the most common currently-used approach to video buffer swapping. The back buffer data is off-screen and this data can be used to update some or all of the displayed on-screen data by swapping, in this case copying, the data into the front buffer. Video page flipping is an approach whereby the video logic is updated to allow the screen to refresh from alternate buffers-in other words, in a double buffering context, the buffers alternate with the old back buffer becoming the new front buffer for the current frame with the screen refreshing from this new front buffer while the front buffer of the previous frame, the old front buffer, becomes the new back buffer for the current frame. The next frame is then rendered into the current back buffer and the buffers are again flipped in an ongoing process of swapping the buffer which serves as the current front buffer. Auxiliary per pixel control is an approach whereby an additional layer is used containing, on a per pixel basis, information to determine which buffer should be displayed. It is generally faster than the other two approaches and allows for fine grain independent control for multiple windows. Auxiliary per pixel control can only be implemented if the appropriate hardware support exists, which is generally not the case with conventional hardware with the notable exception of the envisaged performance under the Direct Rendering Infrastructure. Kevin E. Martin et al., *Direct Rendering Infrastructure, Low-Level Design Document* (visited Apr. 21, 2000) <http://www.precisioninsight.com/dr/drill.html>.

Software rasterizers can use two types of memory: system and video. Each type of memory has its own advantages and disadvantages. For the purposes of the present invention, information is more quickly loaded into video memory than into system memory. Conversely, information is more quickly read from system memory than video memory. Depending upon the complexity of the object to be drawn and the number of read-modify-write operations in video memory that must be performed, drawing in video memory may be faster than drawing in system memory. A large number of read-modify-write operations means that drawing in system memory is more efficient while a small number of read-modify-write operations means that drawing in video memory is more efficient. Despite this disparity, conventional Web browsers and other graphics programs draw into video memory because they do not generally use a large number of read-modify-write operations, and can use hardware to accelerate many of these operations.

Kai's Power Tools 3™ (KPT3) from MetaTools™ implements a double buffering process with a Z-buffer to internally draw within the application and, through its Lens f/x feature. KPT3can capture part of the displayed operating system screen before drawing to the screen. KPT3 however is constrained by the operating system (OS) implementation of a single buffer, which means that the OS cannot update underneath the KPT3 display. In Lens f/x, KPT3 implements a cache for an opaque window. The window captures a targeted portion of the screen before moving the KPT3 window to that targeted region with KPT3 updating its internal cache accordingly. This technique fails if the data underneath the KPT3 window changes in any manner. In a Web browser environment, the changes that would cause the KPT3 technique to fail includes resizing, incremental layout, and any type of page animation. A failure with this technique results in image flicker or visuals errors on the display device.

The animation problem evident in the KPT3 technique was largely solved in enhancements to Web browser software. In particular, the plugin application programming interface (API) for Netscape version 4 or later and the OC96 version of Microsoft Internet Explorer ActiveX controls (note that OC96 ActiveX controls also work in applications other than Internet Web browsers) both implement a windowless plugin and control feature that allows transparent drawing to an area of a Web page. This integration of transparent drawing with the browser software eliminated much of the animation problem evident in the KPT3 technique. However, the plugin-control standard still implements double buffering in video memory thus failing to solve the previously mentioned speed problem resulting when a large number of read-modify-write operations are necessary, such as in the case of animation with transparency. As stated earlier, drawing to video memory is faster than system memory but reading from video memory is comparatively very slow. Complex 3D objects and animation, especially using many transparent pixels and textures, involve a considerable amount of reading from the Web browser buffers in video memory because these objects contain a large amount of data that requires frequent updating, such as shadows, during animation playback and 3D object rotation. This large amount of reading (read-modify-write) from the Web browser back buffer in video memory does not allow sufficiently fast or consistent animation, 3D object updating, or even 2D object updating when many transparent pixels exist.

Microsoft Chromeffects™ attempted to address this problem in a product that never shipped by allowing the browser to draw to system memory rather than video memory. Chromeffects™ used a double buffering system without a Z-buffer so as to collapse the Web page into a flat image. Since Chromeffects™ was not commercially shipped, the details of their implementation of their proposed enhancement is not known.

The X Windows system, including the Linux operating system, uses the Enlightment™ window manager, which is similar to other technologies, to provide window translucency and background animation using screen captures. Translucency is an additional feature previously available in KPT3 and MacOS extensions prior to the development of Enlightment. All three implementations—Linux Enlightenment, KPT3, and MacOS-use a similar technique. This technique uses a non-Web browser double-buffer interface without a Z-buffer to cache the desktop data like KPT3does for an opaque window. A window is then transparently drawn over the desktop. Enlightment, unlike KPT3, performs the capture of desktop data in a time-based manner independent of draw time. This time-based screen capture is determined by Enlightment not by any external input. This technique is termed "translucent moves" in Enlightment and Linux.

In a normal 2D and 3D rendering, very few of the pixels are transparent and, in fact, 2D and 3D drawing and animation does not require transparency. Without transparency, the graphics hardware or a software renderer can perform very fast 2D and 3D drawing without any deviation from conventional drawing techniques. However, high-quality 2D and 3D drawing and animation generally does have transparency which benefits from the improved method and system for displaying a composited image described in the present invention. It may be possible with future consumer graphics hardware to draw transparent surfaces efficiently without the need for the present invention, however, this option is not readily available today.

SUMMARY OF THE INVENTION

The present invention solves the speed performance problem arising from the integration of transparent objects and animation with a window, such as a Web page. The present invention provides a method and system for displaying a composited image using multiple buffering without a Z-buffer and with at least one of the multiple buffers implemented in addition to the container's (the host program, such as a Web browser) buffers. It achieves its solution by using two container-provided buffers (one off the screen and the other on-screen and visible to the user), and at least one auxiliary buffer allocated by the plugin-control (to cache the browser image). One or more additional buffers are commonly used by the plugin-control to compose and draw a scene. The example plugin-control uses one additional buffer (and several buffers for texture maps) to compose the 2D or 3D scene. The present invention implements at least one additional buffer as a buffer in system memory like most compositing system. However, the present invention is a third-party plugin-control and is particularly useful where the host program back buffer is in video memory as is the case with Internet Web browsers.

The present invention may be implemented as, for example, a Netscape plugin or Internet Explorer ActiveX control. According to an example embodiment, the plugin-control can function according to the browser API allowing the browser to write the Web page data to the video memory back buffer. The plugin-control retrieves from the back buffer a background image, such as a Web page, composites a compositing plane over the background image, and returns the updated frame data to the Web browser back buffer which then draws the updated information into the front buffer. The plugin-control can also bypass the browser API and directly draw the updated frame data to the front buffer in video memory thereby directly updating the Web page outside of the bounds defined by the browser API protocol.

The example plugin-control according to the present invention executes its drawing functions using either drawing or timing events provided by the Web browser to initiate a draw pipe (a drawing pipeline) and a timer pipe (a timer pipeline). The draw pipe implements traditional means of browser drawing while the timer pipe allows the plugin-control to bypass browser drawing conventions. The speed performance gains allow animation at a reasonable resolution and speed even where the animation involves a significant proportion of transparent pixels.

DETAILED DESCRIPTION

Although the embodiments described herein utilize browser software for the Internet World Wide Web (hereinafter referred to the "Web"), the present invention is compatible with any window-based system that allows plugin-controls that can draw transparently, including any browser software, running on any type of information network public or private. For example, the present invention could be implemented on custom developed browser software using a private Intranet, local area network (LAN), metropolitan area network (MAN), wide area network (WAN), or even a wireless network. In an additional example, the present invention could be implemented as an OC96 ActiveX windowless control in the Microsoft Excel spreadsheet application, which is not browser software.

Figure 1:
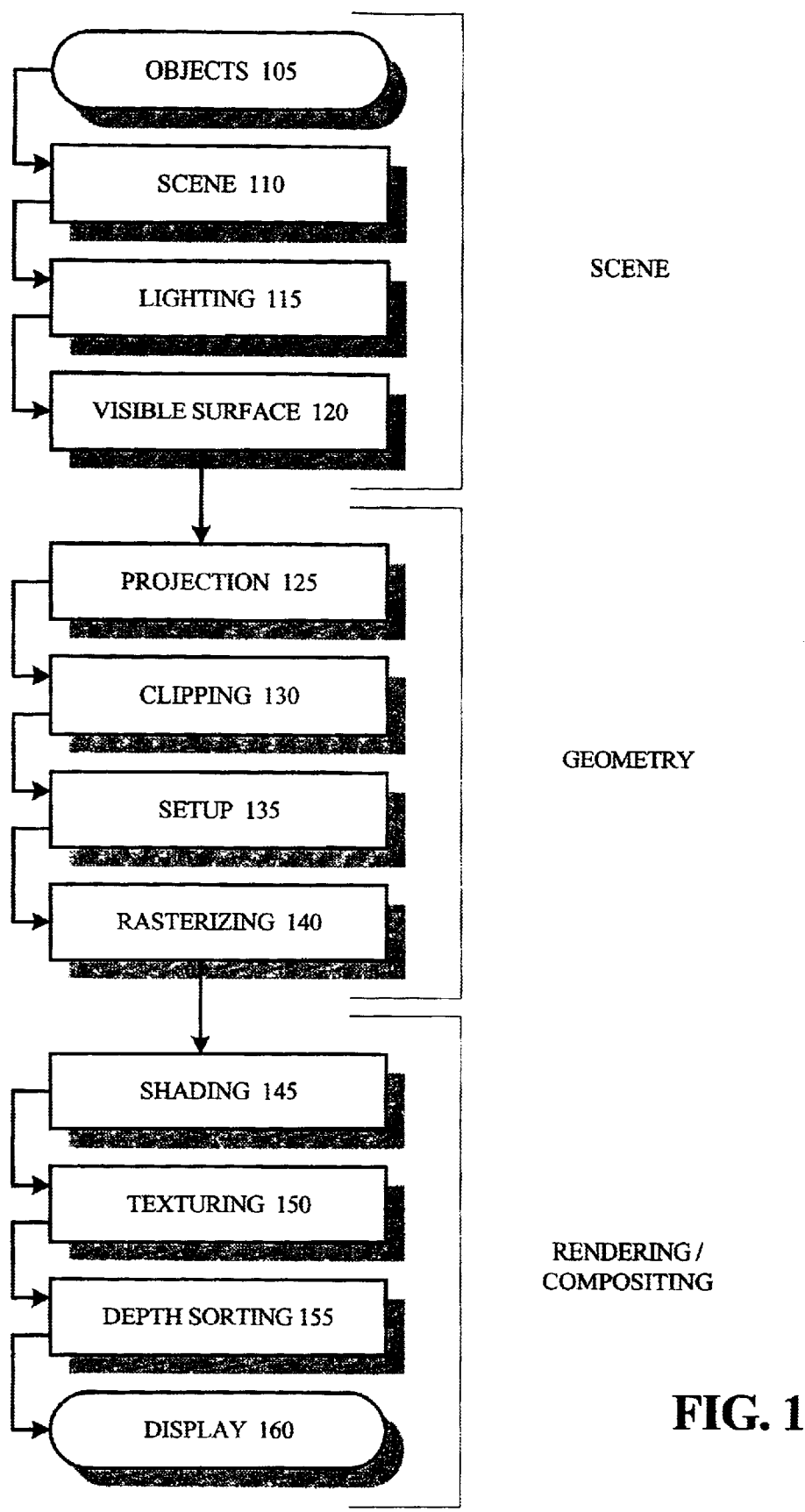
FIG. 1 is a block diagram illustrating an example 3D drawing pipeline according to one conventional embodiment.
Figure 2:
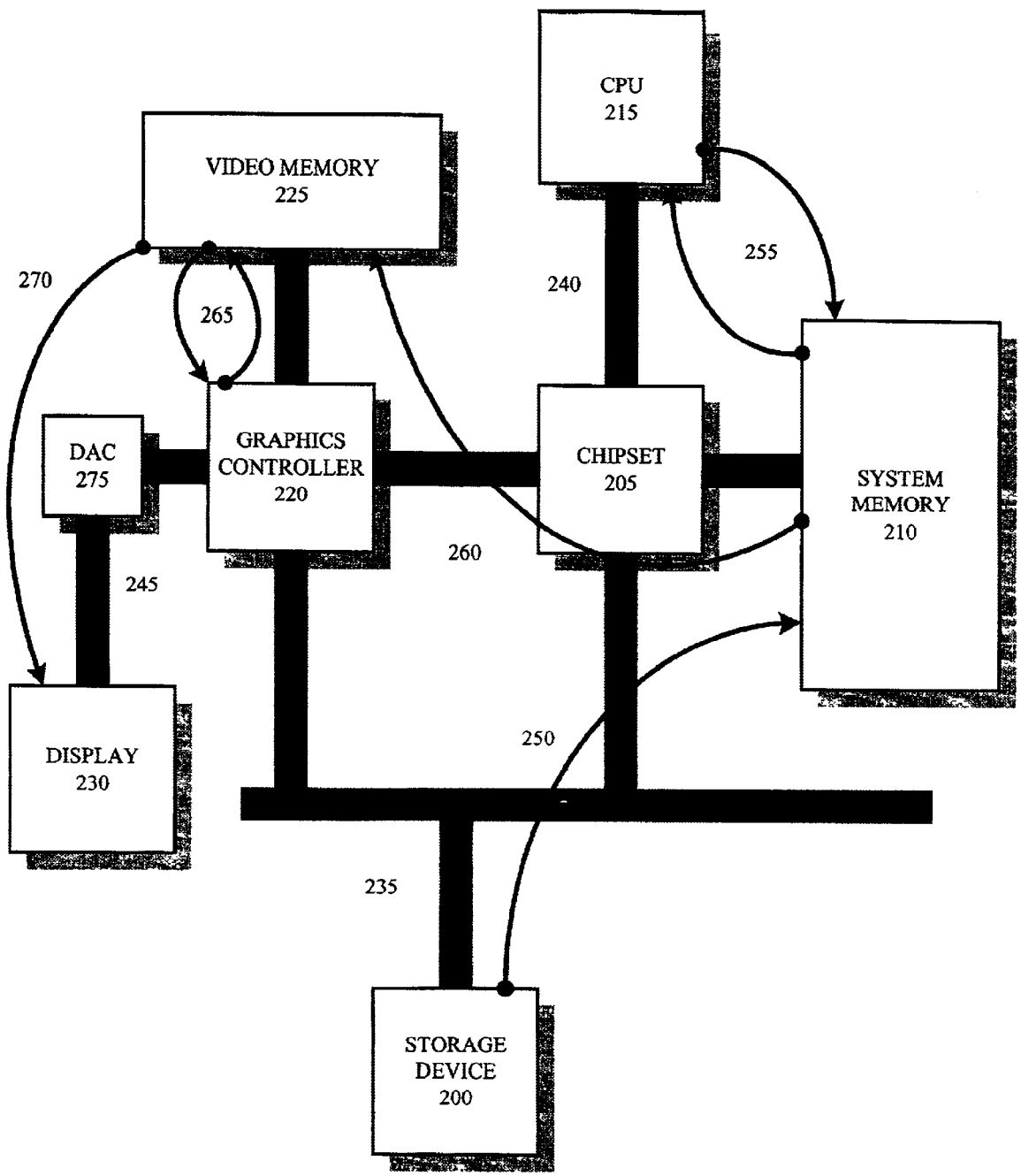
FIG. 2 is a block diagram using a conventional process for displaying texture surfaces in a rendered image to illustrate how complex 3D objects and animations are displayed under conventional means in one embodiment of a computer system using a PCI bus to connect the chipset with the graphics controller.
Figure 3:
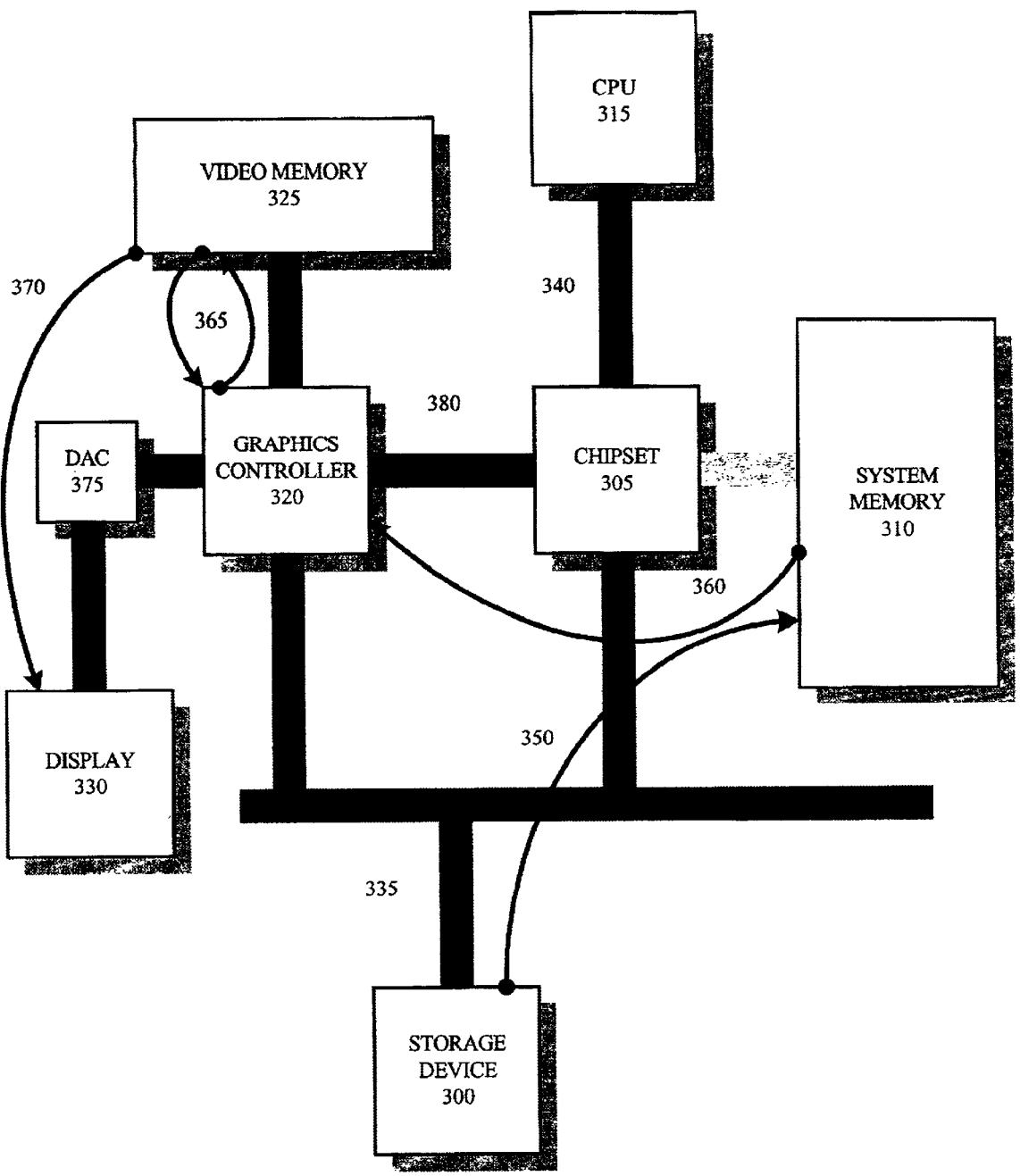
FIG. 3 is a block diagram using a conventional process for displaying texture surfaces in a rendered image to illustrate how complex 3D objects and animations are displayed under conventional means in one embodiment of a computer system using AGP technology, including a high-speed AGP bus to connect the graphics controller to the chipset.
Figure 4:
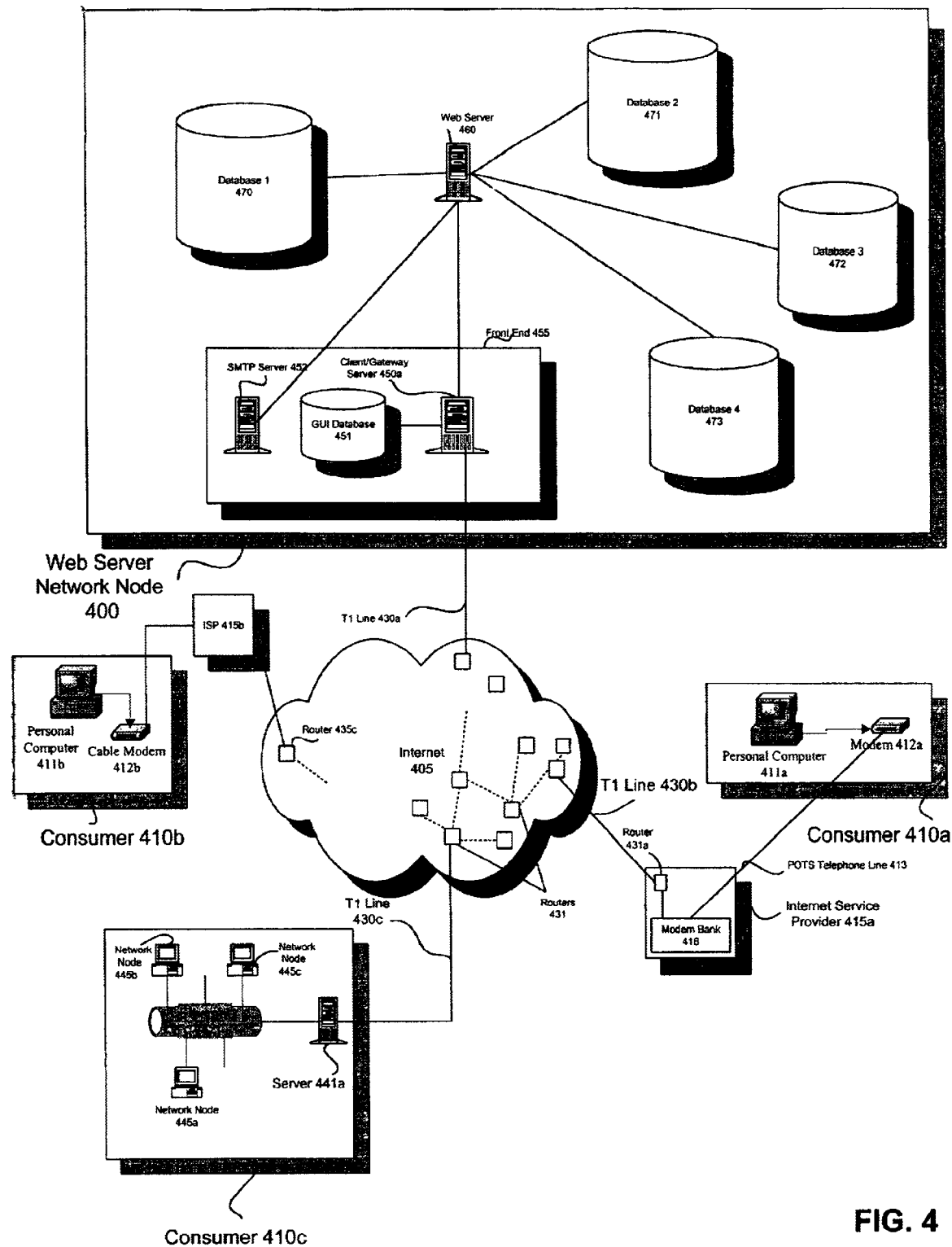
FIG. 4 is a block diagram of a network architecture that illustrates the relationship between a user and a Web page network node according to one embodiment of the present invention.

FIG. 4 is a block diagram of a network topology that illustrates the relationship between the Internet, users, and a Web server network node according to one embodiment of the present invention. The Web server network node 400 makes available one or more Web sites which users can visit by connecting to the Web server network node 400. A Web site is a grouping of one or more associated Web pages sharing a common domain. Each Web page is a Hyper Text Markup Language (HTML) document or eXtensible Markup Language (XML) document, both text-based document markup languages, which contain instructions that are interpreted by a Web browser to provide a display of information to a user.

Users 410a–410c communicate with the Web server network node 400 via the Internet 405. According to the embodiment depicted in FIG. 4, Web server network node 400 is coupled to the Internet 405 via T1 line 430a. User 410a illustrates a typical narrowband user connected to the Internet 405 via a dial-up connection described in more detail below. User 410b illustrates a typical broadband user coupled to the Internet 405 via a cable modem. User 410c illustrates corporate users that are coupled to the Internet 405 via T1 line 430c and server 441a respectively. Corporate user 410c includes three network nodes 445a–445c that share bandwidth on the local Ethernet network 442. Although FIG. 4 illustrates three users 410a–410c, it is to be understood that Web server network node 400 may serve any arbitrary number of users 410 limited only by the processing power and bandwidth available.

User 410a utilizes personal computer 411a and modem 412a to access ISP 415a and navigate the Web 405 via browser software (not shown) and display device (not shown). The browser software permits navigation between various file servers connected to the Internet 405, including gateway server 450a at Web server network node 400. The browser software also provides functionality for the rendering of files distributed over the Internet (i.e., through plugins or ActiveX controls).

User 410b is coupled to the Internet 405 via a broadband cable connection. In particular, personal computer 411b transmits packets via cable modem 412b to ISP 415b where the packets are routed over the Internet 405 to gateway server 450a. Packets from Web server network node 400 traverse a reverse path to user 410b. Similar to user 410a, user 410b utilizes browser software to navigate the Internet 405 and the Web.

Corporate user 410c includes network nodes 445a–445c, which are coupled to the Internet 405 via local Ethernet network 442, server 441a, and T1 line 430c of corporate user 410c. Network nodes 445a–445c may communicate with Web server network node 400 via local Ethernet network 442, server 441a, T1 line 430c, Internet 405, and T1 line 430a. Similar to users 410a–410b, it is assumed that users at network nodes 445a14 445c utilize browser software to navigate the Internet 405 and the Web.

The specific nature of users 410a–410c and the methods through which they are coupled to the Internet 405 depicted in FIG. 4 are merely exemplary. The present invention is compatible with any type of Internet client and/or connection (broadband or narrowband). In general, it is to be understood that users 410 may connect to the Internet 405 using any potential medium whether it be a dedicated connection such as a cable modem, T1 line, DSL ("Digital Subscriber Line"), a dial-up POTS connection or even a wireless connection.

Further elaborating on the browser software discussed above, in the Internet world Netscape's Navigator and Netscape's Communicator Web browsers (both are hereinafter referred to as "Navigator") and Microsoft's Internet Explorer (hereinafter "Explorer") overwhelmingly dominate the market for Web browsers and as such are the only two Web browsers discussed. However, the present invention applies to all Web browsers as well as to non-Web network browsers and any window-based application that permits the use of plugin-controls that can draw in a double-buffered, flicker-free manner, such as Microsoft Excel implementing an OC96 ActiveX control.

The scope of both the Navigator and Explorer browser software is limited out of necessity and therefore they allow third-party software providers to extend the functionality of their browser software. This reliance on third-party software provider extension of browser functionality arises from the very complex nature of the browser programs themselves.

Plugins/Controls

It is often very difficult and time-consuming to write a complex software application that can handle many different types of data. Additionally, it is almost impossible to cover all foreseeable data types. Therefore, many complex software applications are written to perform a limited task well with the option of extending the software's functionality through external applications. The main application uses the external applications, typically called plugins or controls (hereinafter plugin-control), to add to or expand on the functionality that the main application contains.

In order for the two applications to work together in an integrated manner, they should know about each other and be able to communicate with each other. Therefore, a protocol and a communication arrangement between the applications should exist. For example, a protocol using standard Unix pipes to communicate is feasible. The plugin-control can read commands from stdin and print responses to stdout. Like other categories of software, Web browsers have their own specific protocols to facilitate this communication. Navigator uses its plugin Application Programming Interface (API) while Explorer uses Object Linking and Embedding (OLE) objects implemented through ActiveX controls to facilitate communication between the main and external plugin-control applications. The use of external plugin-controls is transparent to the user, also allowing the plugin-controls to be nested with one plugin-control calling other plugin-controls. Navigator plugins and Explorer ActiveX controls accomplish the same tasks with different tools. One example embodiment of the present invention includes one or more Navigator plugins while another example embodiment of the present invention includes one or more ActiveX controls with both embodiments implementing a novel method of providing functionality to Web browsers. For this reason, the differences between Navigator plugins and ActiveX controls are discussed because they effect the implementation of the present invention according to the these embodiments.

As stated earlier, the example embodiments of the present invention use a Navigator plugin or an ActiveX control and are in no way intended to limit the scope of the present invention to these two embodiments alone. The present invention relates to the use of a compositing plane, a drawable area containing text and/or graphical objects with either an opaque or transparent background, with any host application providing double or multiple buffered plugin services, in particular Web browsers, where back buffer rendering is performed exclusively in video or in system memory.

Netscape Plugins

A Navigator plugin is a small dynamically loaded code program module that behaves as if it were part of the Navigator Web browser software. Navigator plugins are used to extend the interactive and multimedia capabilities of the browser software. They can incorporate a number of features such as registering new data types such as MIME (Multipurpose Internet Mail Extensions) types, drawing into a part of a Navigator window, receiving keyboard and mouse events, obtaining data from the network using URLs, posting data to URLs, adding hyperlinks or hotspots to link to new URLs, and drawing into sections on an HTML page. Navigator plugins are code libraries rather than an application or applet and are platform-specific though the Navigator Plugin API provides considerable cross-platform functionality.

Plugins were first incorporated into Navigator version 2.0 released in the first quarter of 1996. Prior to the use of plugins, Navigator functionality could only be extended by using helper applications. A helper application is a separate, free-standing software application that can be started from the Navigator browser. Like a plugin, the browser starts a helper application when the browser encounters a MIME type that is mapped to it. Unlike a plugin, a helper application runs separately from the browser in its own application space and does not interact with the browser or the Web.

ActiveX Controls

Originally termed OLE controls, ActiveX controls are software components that download automatically when used on a Web page. ActiveX controls are referred to herein in a Web browser context but they can work with any application that supports them, such as Microsoft Excel. Explorer first began supporting ActiveX controls in version 3 of the browser (IE3). With IE3, a program using one of several component object model (COM) interfaces can access the methods, properties, and events associated with an ActiveX control. This functionality was expanded in IE4 (Explorer version 4) allowing programs to manipulate objects on the Web page using the document object model (DOM), a COM interface to all the objects on and properties of a Web page. This resulted in improved performance by removing bottlenecks associated with client-side interpretation of functions implemented using the Web page scripting language. In place of interpreting scripts, IE4 allowed the use of compiled C++ code in the ActiveX controls. Another improvement in performance was IE4's ability to host OC96 ActiveX controls. OC96 is an updated specification for ActiveX controls allowing several beneficial properties: windowless control, execution of multiple simultaneous threads, rapid activation, and asynchronous data download. All four enhancements contributing to speed improvements in control execution.

Despite these performance gains, implementing advanced transparent drawing remains too slow for the efficient processing of composited transparent animation and transparent, scalable, and rotatable 2D and 3D objects. According to one embodiment of the present invention, the appropriate plugin-control specification for the Web browser (Netscape plugin API or OC96 ActiveX control) is used with the plugin-control working outside the specification when necessary to increase the efficiency of drawing complex transparent 2D and 3D objects and animation.

Windowless Plugin-Controls

A plugin-control can be either windowed or windowless. A windowed plugin-control is drawn into its own native opaque frame or window on a Web page. On the Unix and Windows platforms, a child window is created for each instance of a plugin-control. On the MacOS platform, which does not support child windows, a rectangular part of the graphics port associated with the browser window is dedicated to the instance of the plugin-control. Windowed plugin-controls handle all the drawing and event handling within the plugin-control window. Windowless plugin-controls, on the other hand, are drawn to a target area not their own window and they can either be opaque or transparent. Both windowed and windowless plugin-controls draw (render or composite images) as part of the Web browser's layout and double-buffered draw pipe into a back buffer with this data later being swapped to a front buffer for display. The windowless plugin-control can draw transparently meaning that parts of the browser window, underneath the windowless plugin-control, appear through the transparent portion of the windowless plugin-control target area. This allows the windowless plugin-control to display non-rectangular areas rather than the opaque rectangular areas allowed for a windowed plugin-control under current versions of browser software. In the example embodiment of the present invention, the browser software, not the windowless plugin-control, controls the drawing and event handling for the target area of a windowless plugin-control. Windowless plugin-controls are not currently supported on XWindows and therefore cannot be used on the Unix platform. The target area of a windowless plugin-control can be a transparent compositing plane requiring blending with the Web page.

The example plugin-control for the present invention is windowless, and therefore does not require a native window of its own. Instead, it is drawn into a target area called a "drawable", an area corresponding to a section of the window that is drawn to the back buffer. The drawable information contains data on position and size and is stored in the NPWindow structure for Navigator and in ATL_DRAWINFO (in ATL—Microsoft's Active Template Library), which provides information from the CComControl class, for Explorer.

In Explorer, IOleInPlaceSiteWindowless::GetWindow is the method (a procedure associated with an object) used to capture low level internals that allow the present invention to directly access the front buffer as discussed below. The window field in the NPWindow structure contains the platform-specific handle to the drawable. For example, on the Windows platform, the platform-specific handle stored in the window field is HDC while on the MacOS the platform-specific handle is CGrafPtr, a pointer to the NP_Port structure. When Navigator calls the NPP_SetWindow method, the value of the handle is used to tell the example plugin-control whether or not it can perform any additional graphics operations on the window. A call to NPP_SetWindow usually indicates that the window has been resized. If the value of the window→window handle is null, the example plugin-control should cease its graphics operations and free resources.

Browser to ActiveX Control Communication

A plugin-control renders its image when requested by its parent window (its container). There are basically two different situations in which a plugin-control receives a rendering request:

1. The plugin-control has a window and that window receives a WM_PAINT message. A plugin-control handles this request in the CComControlBase::OnPaint method.

2. The plugin-control is windowless and the container's window receives a WM_PAINT message encompassing the area occupied by the plugin-control. A plugin-control handles the request in the CComControlBase::OnDrawAdvanced method.

Although the two types of rendering requests arrive at the plugin-control via different mechanisms, the ATL control implementation classes eventually forward the requests to a control's OnDrawAdvanced method. The OnDrawAdvanced method is defined as follows in the control:

virtual HRESULT OnDrawAdvanced(ATL_DRAWINFO& di);

ATL bundles all parameters to the rendering requests into an ATL_DRAWINFO structure. The information in this structure is used when the plugin-control draws. An example of the ATL_DRAWINFO structure, whose fields are similar to the parameters of the iViewObject::Draw method, is described as follows:

```
struct ATL_DRAWINFO
{
    UINT cbSize;
    DWORD dwDrawAspect;
    LONG lindex;
    DVTARGETDEVICE* ptd;
    HDC hicTargetDev;
    HDC hdcDraw;
    LPCRECTL prcBounds;
    LPCRECTL prcWBounds;
    BOOL bOptimize;
    BOOL bZoomed;
    BOOL bRectInHimetric;
    SIZEL ZoomNum;
    SIZEL ZoomDen;
};
```

The example plugin-control uses the default ATL provided implementation of the OnDrawAdvanced method in the CComControl class according to one embodiment of the present invention. In another embodiment of the present invention, the example plugin-control may reimplement the OnDrawAdvanced method to improve performance or to obtain different results such as circumventing the OnDrawAdvanced preparation of a normalized context for drawing in OnDraw so that the global coordinate system of the page can be used for calculations. The default implementation is as follows:

```
inline HRESULT CComControlBase::OnDrawAdvanced
(ATL_DRAWINFO& di)
{
    BOOL bDeleteDC = FALSE;
    if(di.hicTargetDev == NULL) {
        di.hicTargetDev = AtlCreateTargetDC(di.hdcDraw, di.ptd);
        bDeleteDC = (di.hicTargetDev != di.hdcDraw);
    }
    RECTL rectBoundsDP = *di.prcBounds;
    BOOL bMetafile = GetDeviceCaps(di.hdcDraw, TECHNOLOGY) ==
        DT_METAFILE;
    if(!bMetafile) {
        LPtoDP(di.hicTargetDev, (LPPOINT)&rectBoundDP, 2);
        SaveDC(di.hdcDraw);
        SetMapMode(di.hdcDraw MM_TEXT);
        SetWindowOrgEx(di.hdcDraw, 0, 0, NULL);
        SetViewportOrgEx(di.hdcDraw, 0, 0, NULL);
        di.bOptimize = TRUE;
    }
    di.prcBounds = &rectBoundsDP;
    GetZoomInfo(di);
    HRESULT hRes = OnDraw(di);
    if(bDeleteDC)::DeleteDC(di.hdcTargetDev);
    if(!bMetafile) RestoreDC(di.hdcDraw, -1;
    return hRes;
}
```

The CComControl::OnDrawAdvanced method prepares a normalized device context (a device context with some or all device context defaults such as: MM_TEXT for mapping mode; a window origin of 0,0; and the viewport origin of 0,0) for drawing, then calls the example plugin-control's class OnDraw method. The example plugin-control normalizes the device context passed by the Explorer container based on the viewport origin by using the OnDrawAdvanced method as defined and does not override either the OnDrawAdvanced or OnDraw methods because the example plugin-control does not need an non-normalized device context (the device context in its current state when passed by the control's container). In the ActiveX embodiment of the example plugin-control, the draw pipe (discussed later) is the new OnDrawAdvanced pipe.

Browser to Navigator Plugin Communication

Just as Explorer communicates with the example plugin-control using the uniquely defined OC96 API of ActiveX, the example plugin-control communicates with Navigator by calling the Netscape methods provided in Navigator. The example plugin-control calls three drawing event handling methods to control how the plugin-control draws: NPN_ForceRedraw; NPN_InvalidateRect; and NPN_InvalidateRegion. Before a windowless plugin drawable can be refreshed or repainted, the plugin-control first invalidates the area using one of two methods: NPN_InvalidateRect and NPN_InvalidateRegion. Both function in a similar manner by first invalidating the designated area and second by causing Navigator to call the NPP_HandleEvent method to send a paint or update event to the plugin-control. The syntax to call the NPN_InvalideRect method is:

include<npapi.h> void NPN_InvalidateRect (NPP instance, NP_Rect *invalidRect);

The syntax to call the NPN_InvalidateRegion method is similar:

include<npapi.h> void NPN_InvalidateRegion (NPP instance, NP_Region invalidRegion);

The instance parameter for both methods is the current instance of the plugin-control. The invalidRect and invalidRegion parameters both represent the area to be invalidated. When the example plugin-control calls either of these methods, it receives a paint message to redraw the invalid areas of the windowless plugin-control at the regularly timed interval (discussed later). In order to force a paint message so that the invalid area is written immediately, the example plugin-control calls the NPN_ForceRedraw method after invalidating the area as previously discussed. Below, the syntax for calling the NPN_ForceRedraw method is shown:

include<npapi.h> void NPN_ForceRedraw (NPP instance);

The parameter "instance" represents the instance of the plugin-control which is to receive the paint event. On the Windows platform, the example plugin-control receives a paint event, as discussed earlier, with the 1Param parameter of the paint event message containing a pointer to an NPRect structure object, the NPRect structure defining the boundaries of the update area. On the MacOS platform, the example plugin-control receives an update event with the clipRegion of the CGrafPtr pointer to the drawable containing the update region.

Browser Drawing

As stated earlier, Web browser software does not typically use a Z-buffer or Z-array but instead, Web browser software uses a Z-order. According to the Z-order, objects farther back are drawn first with objects more forward drawn in sequence from back to front. According to one embodiment of the present invention, the compositing plane is drawn on top of the browser window after all other objects on the window have been drawn and not beneath the browser window or beneath other objects on the browser window.

Draw Pipe

The present invention represents an enhancement overcoming the limitations of video memory that exist when displaying complex transparent 2D graphics, 3D graphics and animation, which involve many read-modify-write operations. The present invention, according to one embodiment, uses two pipes (or pipelines) of information to initiate its unique method of drawing: a draw pipe; and a timer pipe. In computer programming, a pipe is a technique for passing information from one program process to another-in other words, a conduit for information. Unlike other forms of interprocess communication (IPC), a pipe is generally one-way communication. In the context of the example embodiment of the present invention, these pipes are one-way communication that outline alternate sequences of steps that implement the novel method for displaying a compositing plane with a parent window using a plugin-control.

Figure 5:
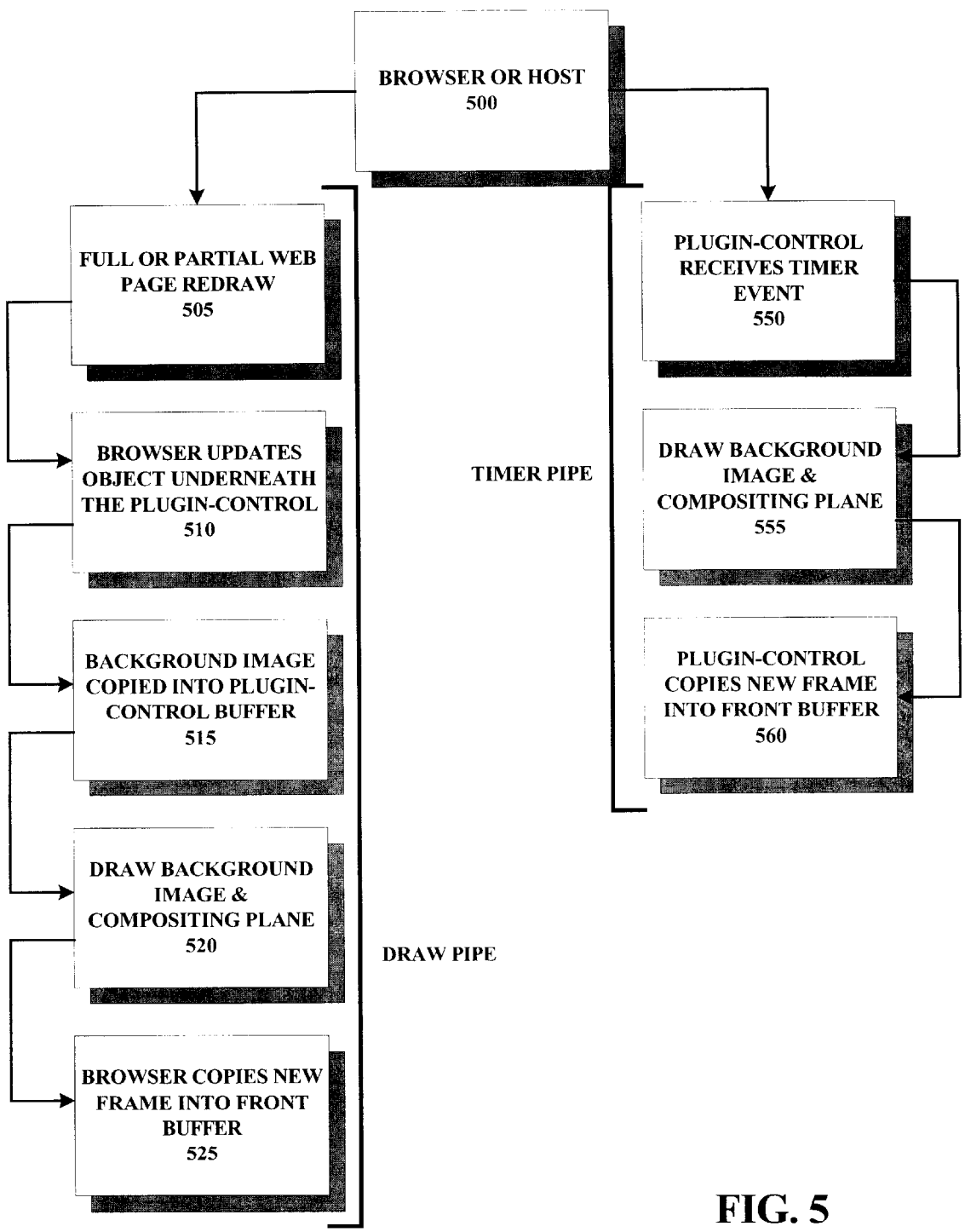
FIG. 5 is a block diagram illustrating the draw pipe and timer pipe according to one embodiment of the present invention.
Figure 6:
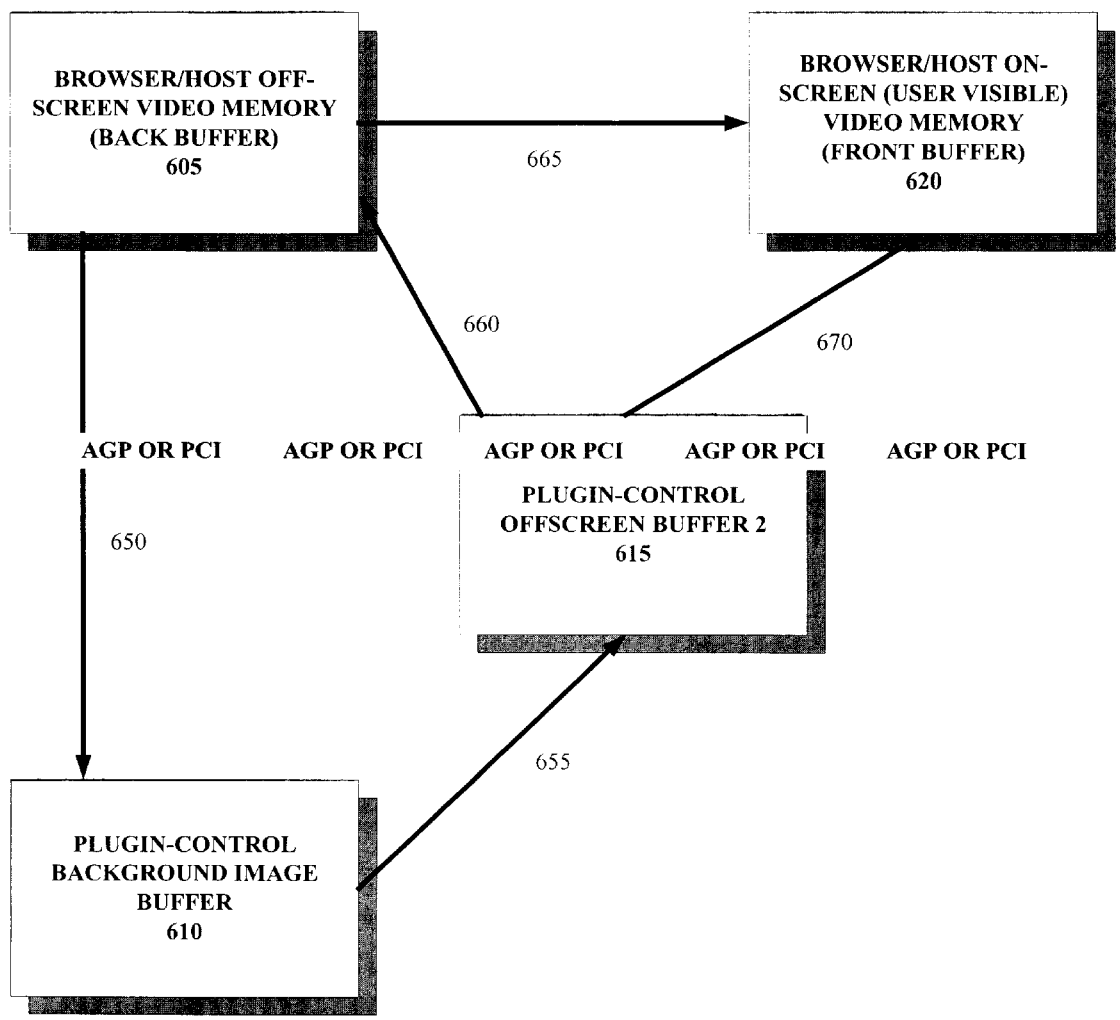
FIG. 6 is a block diagram illustrating the buffers used in system and video memory and the process flow of the draw and timer pipes according to one embodiment of the present invention.

FIG. 5 is a block diagram illustrating the draw pipe and timer pipe according to one embodiment of the present invention. FIG. 6 is a block diagram illustrating the buffers used in system and video memory and the process flow of the draw and timer pipes according to one embodiment of the present invention. Alternative embodiments of both the draw pipe and timer pipe are possible for the present invention. Using an embodiment of the present invention where the plugin-control works with a Web browser, the Web browser or host program 500 will at various times initiate draw messages that are sent to the plugin-control, as previously discussed, or will generate timer messages. Draw messages are generated as a result of changes to the frame being displayed and can result in a partial or full redraw of the Web page 505. An example of a draw message is a message sent through the OnDrawAdvanced method of the CComControl interface of ATL for Explorer. As stated earlier in the discussion on the 3D graphics pipeline, the browser follows a process whereby objects underneath the plugin-control are updated 510 in the back buffer within video memory 605. Once these underlying objects are updated 510, the plugin-control captures information from the device context that is sent as part of the draw message, such as the device context parameter in an OnDrawAdvanced Explorer message. The example plugin-control uses the device context to determine the client region that has been updated by the Web browser 515. Using this client region information, the example plugin-control updates the clean copy of the displayed frame 650 stored in a plugin-control cache 610, a background image buffer 610, in system memory. If there is no data in the background image buffer 610 because the plugin-control has recently initialized, an entire clean copy of the displayed frame is copied 515, 650 into the background image buffer 610. "Clean copy" refers to a copy of the displayed frame without the additional plugin-control compositing plane data.

Once a clean copy of the updated background image is stored 515, 650 in the background image buffer 610, the plugin-control composites the compositing plane data with the background image generating a partial or wholly updated frame 520, 655 which is stored in a second plugin-control back buffer (off-screen buffer) 615. In FIG. 6, the "AGP OR PCI" bar refers to a example computer system's AGP or PCI bus used to write from system memory to video memory. In FIG. 6, the buffers shown above the AGP OR PCI bar reside in video memory, and the buffers shown below the AGP OR PCI bar reside in the system memory. The second plugin-control back buffer 615 is shown on both sides of the AGP OR PCI bar indicating that it can be implemented in either video or system memory, depending on which is more efficient. In a case where a small amount of data with limited read-modify-write operations are involved, implementing the second plugin-control back buffer 615 in video memory may be more efficient. However, in the plugin-control according to the present invention, the second plugin-control back buffer 615 is typically implemented in system memory since it is generally more efficient. Once the compositing plane and background image have been drawn 520, 655 to the second plugin-control back buffer 615, the updated frame data is then written 520, 660 to the back buffer of the Web browser or host program 605, which is in video memory. The Web browser or host program then copies the updated frame data 525, 665 from the Web browser or host program back buffer 605 to the on-screen front buffer 620 in video memory resulting in the user visible display reflecting the update frame data.

Timer Pipe

A Web browser or host program 500 sends out timer events on a consistent basis, e.g., 30 timer events per second. The example windowless plugin-control receives the timer event 550 and begins an additional pipeline for drawing, the timer pipe. Unlike the draw pipe, timer events are not issued when the underlying background image has changed. Therefore, it is possible that draw events exist (changes in the background image) eventually resulting in the initiation of a draw pipe but where the draw pipe has not yet been executed at the time the timer pipe is executing. These events may result in changes to the clip region underneath the compositing plane and this changed clip region may not accurately be reflected in the device context. For ActiveX controls, the device handle contains the correct clip region and, therefore, the clean copy of the background image stored in the background image buffer 610 is still an accurate reflection of the data. For this reason, the background image buffer 610 does not need to be updated. Therefore, once the timer event has been received and a draw pipe is not in process 550, the example ActiveX embodiment of the plugin-control composites the compositing plane data with the copy of the background image 555, 655 stored in the background image buffer 610 generating a partial or wholly updated frame 555, 655 stored in a second plugin-control back buffer 615. The example ActiveX plugin-control then copies, by bit-block transfers (bitblts) 560, 670 according to one embodiment of the present invention, the updated frame data from the second plugin-control back buffer 615 directly into the on-screen front buffer 620 in video memory.

If the example plugin-control is a Navigator plugin, the clip region underneath the compositing plane may not be accurately reflecting in the device context if pending draw events exist and are waiting to be resolved. In order to obtain a correct clip region over which the compositing plane is to be composited with host program window, the Navigator plugin embodiment of the example plugin-control performs additional steps not need by the ActiveX embodiment of the example plugin-control. The timer pipe steps for the Navigator plugin embodiment still begin with receiving a timer event 550 as previously discussed. However, the Navigator plugin embodiment next initiates a call to NPN_ForceRedraw causing the Navigator to force the pending draw events (existing invalidations) to be resolved in a step similar to 510. Once all pending updates have been resolved, the background image is cached (copied) 650 into the example plugin-control's background image buffer 610 in a step similar to 515. A flag indicating whether the background image needs to be cached before proceeding with the timer pipe is then set to false. The example plugin-control composites the compositing plane and the background image 555 storing the composited image 655 in the second plugin-control buffer 615. The Navigator plugin embodiment then copies the composited image 660 to the Navigator back buffer 605 in video memory in a step similar to 560. The example plugin-control initiates a call to NPN_InvalidateRect or NPN_InvalidateRegion marking the area in which the compositing plane is drawn followed by a second call to NPN_ForceRedraw causing the browser to write the update region 665 to the on-screen front buffer 620 in video memory. The flag tells the plugin-control not to recache (copy the background image again into the plugin-control background image buffer). The Navigator embodiment of the example plugin-control then concludes the timer pipe by resetting the flag to true so that the next time a timer pipe is executed, the background image is cached following the first NPN_ForceRedraw.

Synchronization and Direct Writing

The example plugin-control is single threaded according to one embodiment of the present invention. Therefore, synchronization is implicit because only one call can execute at one time. If a draw pipe is initiated, the plugin-control does not begin a timer pipe until the draw pipe has entirely completed. Similarly, a draw pipe will not execute until a timer pipe has entirely completed.

Buffer Swapping

The example plugin-control, according to one embodiment of the present invention, takes advantage of the double buffering or multiple buffering approach used by its host application and hardware to update the on-screen front buffer data shown on the display device. Alternative embodiments of the present invention may implement other means for buffer swapping provided that any necessary hardware, operating system, and graphics controller support exist for the alternative approach. Conventional Internet Web browsers used on personal computers implement bit-block transfer ("bitblt") operations to copy data from an off-screen back buffer into the on-screen front buffer. Thus, according to one embodiment of the present invention where the example plugin-control is a Web browser plugin-control, the example plugin-control used with a conventional Web browser will use the currently prevalent bitblt means to copy data from the back to the front buffer. In alternative embodiments, the example plugin-control may use alternative hardware and software buffering approaches, such as video page flipping and auxiliary per pixel control both discussed earlier, to swap data into the front buffer.

Zero-size Window for Hardware Scrolling

In connection with hardware scrolling, when the browser signals the graphics controller to translate the contents of the window, the origin (grid coordinate system) of the parent window, such as the Web page, is altered on-screen without the windowless plugin-controls immediately being informed of the change. The browser will only immediately call the draw pipe for plugin-controls that are newly scrolled onto the screen. If the example plugin-control is not one of these newly scrolled plugin-controls, it will not receive a normalized device context (drawable) accounting for this change until it receives its windowless draw pipe messages from the Web browser. Unfortunately, this update may not occur before the timer draw pipe allows the plugin-control to draw. The parent window retains all coordinate and other information regarding hardware scrolling because during normal operation, a windowless plugin-control does not need that information until it receives the draw pipe messages from the browser. Unlike a normal windowless plugin-control, the example plugin-control can directly write into the front buffer and the display, as discussed below, and, in implementing such functionality, the example plugin-control needs scrolling information to maintain its spatial display synchronization with the browser Web page. Without a normalized device context or handle, the windowless plugin-control will draw in an incorrect location on the screen causing problems with the data displayed.

One embodiment of the windowless plugin-control solves this problem implementing a separate zero-size window, a child window as discussed earlier, when the example windowless plugin-control is first initialized. The zero-size window and the example plugin-control each separately receive events from the Web browser. The example plugin-control remains windowless and can therefore still execute transparent drawing but the separate zero-size window receives scrolling events from the parent window which allow the zero-size window's event handler to update a variable called "offset", containing a single X, Y offset parameter, that the windowless plugin-control can later access when writing from the timer pipe in order to draw to the correct area of the window. According to the example plugin-control, all other events do not require special procedures and are handled by the conventional means of the Web browser and the operating system.

What is claimed is:

1. A method for displaying a composited image, comprising:
   (a) creating, by a plugin-control, a compositing plane in a system memory;
   (b) receiving, by the plugin-control, from a video memory a background image;
   (c) storing, by the plugin-control, the received background image in the system memory;
   (d) compositing, by the plugin-control, the compositing plane and the stored background image to form the composited image; and
   (e) writing, by the plugin-control, the composited image to a buffer in the video memory.

2. The method according to claim 1, further comprising: defining the plugin-control using the Netscape Application Programming Interface (API).

3. The method according to claim 2, wherein the defining step includes the step of:
   defining the plugin-control as at least one of a Netscape Navigator plugin and a Netscape Communicator plugin.

4. The method according to claim 1, further comprising: providing the plugin-control as an ActiveX control.

5. The method according to claim 1, wherein step (e) includes the step of writing, by the plugin-control, the composited image to a buffer in at least one of a local video memory, a graphics controller memory, a frame buffer, and an off-screen Random Access Memory (RAM).

6. The method according to claim 1, wherein step (e) includes the step of writing, by the plugin-control, the composited image to a buffer in at least one of a local video memory, an Accelerated Graphics Port (AGP) memory, a non-local video memory, a frame buffer, and an off-screen Random Access Memory (RAM).

7. The method according to claim 1, wherein the background image includes at least one of a browser page component and a grouping of a plurality of the browser page components assembled by a browser application.

8. The method according to claim 7, further comprising: providing an Internet Web browser as the browser application.

9. The method according to claim 8, wherein the providing step includes the step of:
   providing the Internet Web browser as at least one of Netscape Navigator, Netscape Communicator, and Microsoft Internet Explorer.

10. The method according to claim 7, further comprising: defining the browser page component as an Internet Web page component and the grouping of a plurality of the browser page components as a grouping of a plurality of the Internet Web page components.

11. The method according to claim 7, further comprising:
defining the browser page component as an Internet Web page object and the grouping of a plurality of the browser page components as a grouping of a plurality of the Internet Web page objects.

12. The method according to claim 1, further comprising:
defining the compositing plane containing a plurality of transparent pixels.

13. The method according to claim 12, wherein the defining step includes the step of:
defining the compositing plane containing at least one of a 3-D object, a 3-D animation, a 2-D vector animation, and a blue-screened video.

14. The method according to claim 1, wherein step (e) includes the step of:
writing, by the plugin-control, the composited image to a front buffer containing data displayed on a display device.

15. The method according to claim 14, wherein step (e) includes the step of:
writing, by the plugin-control, the composited image to a front buffer containing at least one of a fully rendered scene, the background image, and the composited image data displayed on a display device.

16. The method according to claim 15, wherein step (e) includes the step of:
writing, by the plugin-control, the composited image to a front buffer containing at least one of an Internet Web page, the background image, and the composited image data displayed on a display device.

17. The method according to claim 15, wherein step (e) includes the step of:
writing, by the plugin-control, the composited image to a front buffer containing at least one of a fully rendered scene, an Internet Web page, and the composited image data displayed on a display device.

18. The method according to claim 15, wherein step (e) includes the step of:
writing, by the plugin-control, the composited image to a front buffer containing at least one of a fully rendered scene, the background image, and an Internet Web page displayed on a display device.

19. The method according to claim 14, further comprising:
providing a monitor as the display device.

20. The method according to claim 1, further comprising:
providing the buffer as the back buffer.

21. The method according to claim 20, further comprising:
providing a frame buffer used for rendering as the back buffer.

22. The method according to claim 21, further comprising:
defining the back buffer as rendering at least one of a scene and the composited image.

23. The method according to claim 22, further comprising:
providing an Internet Web page as the scene.

24. The method according to claim 22, further comprising:
providing an Internet Web page as the composited image.

25. The method according to claim 21, further comprising:
defining the back buffer as containing a copy of the background image.

26. The method according to claim 25, further comprising:
providing an Internet Web page as the background image.

27. The method according to claim 1, wherein step (e) includes:
writing, by the plugin-control, the composited image directly to a front buffer without first writing the composited image to a back buffer.

28. A method for displaying a composited image combining a background image from a host program and a compositing plane from an external program, comprising:
(a) creating, by the external program, the compositing plane in a system memory;
(b) receiving, from the host program, the background image;
(c) caching, by the external program, the background image in the system memory;
(d) compositing, by the external program, the compositing plane and the background image to form the composited image; and
(e) writing, by the external program, the composited image to a buffer in the video memory.

29. The method according to claim 28, wherein step (e) includes the step of writing, by the external program, the composited image to a buffer in at least one of a local video memory, a graphics controller memory, a frame buffer, and an off-screen Random Access Memory (RAM).

30. The method according to claim 29, wherein step (e) includes the step of writing, by the external program, the composited image to a buffer in at least one of a local video memory, an Accelerated Graphics Port (AGP) memory, a non-local video memory, a frame buffer, and an off-screen Random Access Memory (RAM).

31. The method according to claim 28, wherein the background image includes at least one of a browser page component and a grouping of a plurality of the browser page components assembled by a browser application.

32. The method according to claim 31, further comprising:
providing an Internet Web browser as the browser application.

33. The method according to claim 32, wherein the providing step includes the step of:
providing the Internet Web browser as at least one of Netscape Navigator, Netscape Communicator, and Microsoft Internet Explorer.

34. The method according to claim 31, further comprising:
defining the browser page component as an Internet Web page component and the grouping of a plurality of the browser page components as a grouping of a plurality of the Internet Web page components.

35. The method according to claim 31, further comprising:
defining the browser page component as an Internet Web page object and the grouping of a plurality of the browser page components as a grouping of a plurality of the Internet Web page objects.

36. The method according to claim 28, further comprising:
defining the compositing plane containing a plurality of transparent pixels.

37. The method according to claim 36, wherein the defining step includes the step of:

defining the compositing plane containing at least one of a 3-D object, a 3-D animation, a 2-D vector animation, and a blue-screened video.

38. The method according to claim 28, wherein step (e) includes the step of:
writing, by the external program, the composited image to a front buffer containing data displayed on a display device.

39. The method according to claim 38, wherein step (e) includes the step of:
writing, by the external program, the composited image to a front buffer containing at least one of a fully rendered scene, the background image, and the composited image data displayed on a display device.

40. The method according to claim 39, wherein step (e) includes the step of:
writing, by the external program, the composited image to a front buffer containing at least one of an Internet Web page, the background image, and the composited image data displayed on a display device.

41. The method according to claim 39, wherein step (e) includes the step of:
writing, by the external program, the composited image to a front buffer containing at least one of a fully rendered scene, an Internet Web page, and the composited image data displayed on a display device.

42. The method according to claim 39, wherein step (e) includes the step of:
writing, by the external program, the composited image to a front buffer containing at least one of a fully rendered scene, the background image, and an Internet Web page displayed on a display device.

43. The method according to claim 38, further comprising:
providing a monitor as the display device.

44. The method according to claim 28, further comprising:
providing the buffer as the back buffer.

45. The method according to claim 44, further comprising:
providing a frame buffer used for rendering as the back buffer.

46. The method according to claim 45, further comprising:
defining the back buffer as rendering at least one of a scene and the composited image.

47. The method according to claim 46, further comprising:
providing an Internet Web page as the scene.

48. The method according to claim 46, further comprising:
providing an Internet Web page as the composited image.

49. The method according to claim 44, further comprising:
defining the back buffer as containing a copy of the background image.

50. The method according to claim 49, further comprising:
providing an Internet Web page as the background image.

51. The method according to claim 28, wherein step (e) includes:
writing, by the external program, the composited image directly to a front buffer without first writing the composited image to a back buffer.

52. A system for displaying a composited image, comprising:

a system memory;
a video memory;
a graphics controller, wherein the graphics controller is adapted to:
(i) create and manage at least two buffers in the video memory, the at least two buffers including a front buffer and a back buffer,
(ii) render a background image into the back buffer, and
(iii) swap between the at least two buffers in video memory to update a video display; and
a plugin-control, wherein the plugin-control is adapted to:
(i) create and manage at least one buffer in system memory,
(ii) copy the background image from the back buffer,
(iii) store the background image in the at least one buffer in system memory,
(iv) composite a compositing plane and the background image to form a composited image, and
(v) copy the composited image to a buffer in the video memory.

53. The system according to claim 52, wherein the video memory is at least one of a local video memory, a graphics controller memory, a frame buffer, and an off-screen Random Access Memory (RAM).

54. The system according to claim 53, wherein the graphics controller memory is at least one of an Accelerated Graphics Port (AGP) memory and a non-local video memory.

55. The system according to claim 52, wherein the graphics controller is an Accelerated Graphics Port (AGP) controller.

56. The system according to claim 52, wherein the front buffer is a buffer containing data displayed on a display device.

57. The system according to claim 56, wherein the front buffer contains at least one of a fully rendered scene, the background image, and the composited image.

58. The system according to claim 57, wherein the fully rendered scene is an Internet Web page.

59. The system according to claim 57, wherein the background image is an Internet Web page.

60. The system according to claim 57, wherein the composited image is an Internet Web page.

61. The system according to claim 56, wherein the display device is a monitor.

62. The system according to claim 52, wherein the back buffer is a buffer used for rendering.

63. The system according to claim 62, wherein the back buffer is used for rendering at least one of a scene and the composited image.

64. The system according to claim 63, wherein the scene is an Internet Web page.

65. The system according to claim 63, wherein the composited image is an Internet Web page.

66. The system according to claim 62, wherein the back buffer contains a copy of the background image.

67. The system according to claim 52, wherein swapping between the at least two buffers in video memory further comprises at least one of a page flipping, a bit-block transfer, and an auxiliary per pixel control.

68. The system according to claim 67, wherein the bit-block transfer includes the copying of data from the back buffer, wherein the back buffer is off-screen, to the front buffer, wherein the front buffer is on-screen.

69. The system according to claim 52, further including:
a browser program, wherein the browser program is adapted to:

(i) cause the graphics controller to allocate two buffers in the video memory, the at least two buffers including a front buffer and a back buffer,
(ii) assemble components of the background image,
(iii) create the background image, (iii) cause the graphics controller to store the background image in the back buffer,
(iv) provide a draw event to the plugin-control, and
(v) provide a timer event to the plugin-control.

70. The system according to claim 69, wherein the browser program is at least one of Netscape Navigator, Netscape Communicator, and Microsoft Internet Explorer.

71. The system according to claim 69, further comprising:
defining the plugin-control using the Netscape Application Programming Interface (API).

72. The system according to claim 71, wherein the defining step includes the step of:
defining the plugin-control as at least one of a Netscape Navigator plugin and a Netscape Communicator plugin.

73. The system according to claim 69, further comprising:
providing the plugin-control as an ActiveX control.

74. The system according to claim 69, wherein the front buffer is a buffer containing data displayed on a display device.

75. The system according to claim 74, wherein the front buffer contains at least one of a fully rendered scene, the background image, and the composited image.

76. The system according to claim 75, wherein the fully rendered scene is an Internet Web page.

77. The system according to claim 75, wherein the background image is an Internet Web page.

78. The system according to claim 75, wherein the composited image is an Internet Web page.

79. The system according to claim 74, wherein the display device is a monitor.

80. The system according to claim 69, wherein the back buffer is a buffer used for rendering.

81. The system according to claim 80, wherein the back buffer is used for rendering at least one of a scene and the composited image.

82. The system according to claim 81, wherein the scene is an Internet Web page.

83. The system according to claim 81, wherein the composited image is an Internet Web page.

84. The system according to claim 80, wherein the back buffer contains the background image.

85. The system according to claim 84, wherein the background image is an Internet Web page.

86. The system according to claim 69, wherein the background image includes at least one of a browser page component and a grouping of a plurality of the browser page components assembled by a browser application.

87. The system according to claim 86, wherein the browser application is an Internet Web browser.

88. The system according to claim 87, wherein the Internet Web browser is at least one of Netscape Navigator, Netscape Communicator, and Microsoft Internet Explorer.

89. The system according to claim 86, wherein the browser page component is an Internet Web page component and the grouping of a plurality of the browser page components is a grouping of a plurality of the Internet Web page components.

90. The system according to claim 86, wherein the browser page component is an Internet Web page object and the grouping of a plurality of the browser page components is a grouping of a plurality of the Internet Web page objects.

91. The system according to claim 69, wherein the compositing plane contains a plurality of transparent pixels.

92. The system according to claim 91, wherein the compositing plane contains at least one of a 3-D object, a 3-D animation, a 2-D vector animation, and a blue-screened video.

93. A set of instructions residing in a storage medium, the set of instructions capable of being executed by a processor to implement a method for displaying a composited image, the method comprising the steps of:
(a) creating, by a plugin-control, a compositing plane in a system memory;
(b) receiving, by the plugin-control, from a video memory a background image;
(c) storing, by the plugin-control, the background image in the system memory;
(d) compositing, by the plugin-control, the compositing plane and the background image to form the composited image; and
(e) writing, by the plugin-control, the composited image to a buffer in the video memory.

94. A set of instructions residing in a storage medium, the set of instructions capable of being executed by a processor to implement a method for displaying a composited image, the method comprising the steps of:
(a) creating, by a plugin-control, a compositing plane in a system memory;
(b) receiving, by the plugin-control, from a video memory a background image;
(c) storing, by the plugin-control, the background image in the system memory;
(d) compositing, by the plugin-control, the compositing plane and the background image to form the composited image; and
(e) writing, by the plugin-control, the composited image directly to a front buffer in the video memory without first writing the composited image to a back buffer.

95. A set of instructions residing in a storage medium, the set of instructions capable of being executed by a processor to implement a method for displaying a composited image, the method comprising the steps of:
(a) creating a compositing plane in a system memory;
(b) receiving from a video memory a background image;
(c) caching the background image in the system memory;
(d) compositing the compositing plane and the background image to form the composited image; and
(e) writing the composited image to a buffer in the video memory.

96. A set of instructions residing in a storage medium, the set of instructions capable of being executed by a processor to implement a method for displaying a composited image, the method comprising the steps of:
(a) creating a compositing plane in a system memory;
(b) receiving from a video memory a background image;
(c) caching the background image in the system memory;
(d) compositing the compositing plane and the background image to form the composited image; and
(e) writing the composited image directly to a front buffer in the video memory without first writing the composited image to a back buffer.

* * * * *